US011142328B2

(12) United States Patent
Rhoden

(10) Patent No.: US 11,142,328 B2
(45) Date of Patent: Oct. 12, 2021

(54) DRAG CONTROL CONFIGURATION FOR A POWERED AIRCRAFT

(71) Applicant: Hamilton Sundstrand Corporation, Charlotte, NC (US)

(72) Inventor: William E. Rhoden, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 651 days.

(21) Appl. No.: 15/896,487

(22) Filed: Feb. 14, 2018

(65) Prior Publication Data

US 2019/0248503 A1 Aug. 15, 2019

(51) Int. Cl.
*G01C 23/00* (2006.01)
*B64D 31/02* (2006.01)
*H04L 29/06* (2006.01)
*B64C 13/02* (2006.01)

(52) U.S. Cl.
CPC .............. *B64D 31/02* (2013.01); *B64C 13/02* (2013.01); *H04L 63/1416* (2013.01)

(58) Field of Classification Search
CPC ................................ B64D 31/02; B64C 13/02
See application file for complete search history.

(56) References Cited

U.S. PATENT DOCUMENTS

| 9,340,278 | B2 | 5/2016 | Hagerott et al. |
| 2003/0101712 | A1 | 6/2003 | Jonhson |
| 2011/0029158 | A1* | 2/2011 | Klooster ............. G05D 1/0676 701/3 |
| 2011/0138765 | A1* | 6/2011 | Lugg ........................ F02K 1/08 60/39.01 |
| 2016/0229522 | A1 | 8/2016 | Pachikara et al. |
| 2017/0190416 | A1 | 7/2017 | Waltner |
| 2017/0267330 | A1 | 9/2017 | Hreha et al. |
| 2019/0186747 | A1* | 6/2019 | Lowery ................. F02C 7/266 |

OTHER PUBLICATIONS

The Extended European Search Report for EP Application No. 19157124.9, dated Oct. 10, 2019.

* cited by examiner

*Primary Examiner* — Adam M Alharbi
(74) *Attorney, Agent, or Firm* — Carlson, Gaskey & Olds, P.C.

(57) ABSTRACT

A powered aircraft includes at least one thrust producing engine and an engine controller controllably coupled to the at least one thrust producing engine. The engine controller includes at least a first control channel and a drag control channel. The first control channel is configured to control the at least one thrust producing engine via thrust control and the drag control channel is configured to control the at least one thrust producing engine via drag control.

18 Claims, 3 Drawing Sheets

DRAG CONTROL CONFIGURATION FOR A POWERED AIRCRAFT

TECHNICAL FIELD

The present disclosure relates generally to powered aircraft control configurations, and more specifically to an aircraft engine controller including a drag control channel.

BACKGROUND

Powered aircraft are typically powered via one or more aircraft engines statically mounted to the wings, tail, or body of the aircraft. The engines utilize known processes to generate thrust and to power the aircraft. An engine controller is generally provided for each engine, however in some examples a single engine controller can be utilized to control each of the engines in a multi-engine aircraft. In such examples, a second redundant engine controller is typically incorporated in order to prevent single point failure modes. The controller controls engine parameters, such as rotational speed, fuel injection, and the like, in order to control the magnitude of the thrust generated by the engine. This in turn allows the pilot to operate the engine in any desired mode.

In order to ensure continued operation of the powered aircraft in conditions where the engine controller may become faulty, powered aircraft typically include redundant controller channels. In such a configuration, when a first control channel experiences a failure the aircraft switches from the faulty channel to the redundant channel. The redundant controller channels are identical control channels, with controller configurations for setting which control channel is in control at any given time.

SUMMARY OF THE INVENTION

In one exemplary embodiment a powered aircraft includes at least one thrust producing engine, and an engine controller controllably coupled to the at least one thrust producing engine, the engine controller including at least a first control channel and a drag control channel, wherein the first control channel is configured to control the at least one thrust producing engine via thrust control, and the drag control channel is configured to control the at least one thrust producing engine via drag control.

An exemplary method for operating a powered aircraft includes operating in a drag control mode by outputting a fixed thrust for a desired engine operational mode and maintaining a velocity of a powered aircraft within a velocity window corresponding to the fixed thrust by adjusting at least one drag producing component of the aircraft and thereby adjusting a drag of the aircraft.

An exemplary method for operating a powered aircraft includes detecting a cyber-security intrusion at an engine controller, and transitioning from a thrust control channel to a drag control channel within said engine controller in response to detecting the cyber-security intrusion.

These and other features of the present invention can be best understood from the following specification and drawings, the following of which is a brief description.

DETAILED DESCRIPTION OF AN EMBODIMENT

Figure 1:
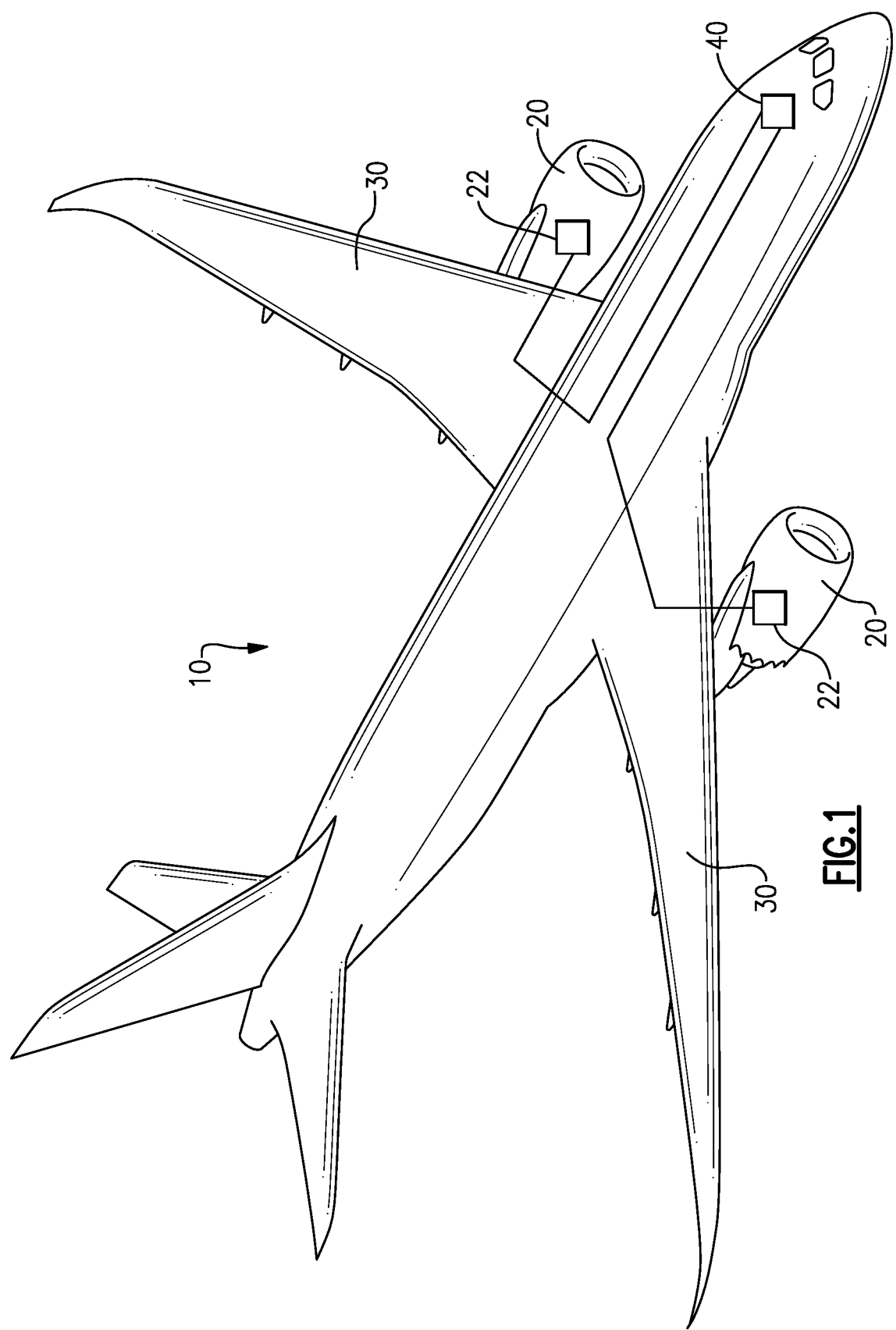
FIG. 1 illustrates an exemplary powered aircraft.

FIG. 1 schematically illustrates an exemplary powered aircraft 10. The exemplary aircraft 10 includes two wing mounted engines 20 statically connected to the wings 30 of the aircraft 10. Each of the engines 20 includes a corresponding engine controller 22 configured to control a thrust output of the engine 20. The engine controllers 22 are communicatively coupled to a general aircraft controller 40. While illustrated as being physically located at a cockpit of the aircraft 10, the general aircraft controller 40 could be located at any position, and electronically connected to the cockpit controls.

Also connected to, and controlled by, the general aircraft controller 40 are multiple drag producing or reducing devices such as speed brakes, landing gear, sideslip, flaps, spoilers, and the like. Engaging and operating the drag producing or reducing devices alters the amount of drag on the aircraft, and thus the amount of thrust required to maintain a given operational mode of the engines 20.

On a modern powered aircraft, the engine controllers 22 are typically electronic controllers, and utilize digital controls. By way of example, the engine controller can be a FADEC (Full Authority Digital Engine Control) system. In some cases, due to the digital nature of the engine controller 22, it is possible for a cyber-security based intrusion to occur resulting in one or more of the engine controllers 22 incorrectly operating the corresponding engine 20. In large aircraft 10 utilizing multiple engines, when such an error occurs, the aircraft 10 can shut off a compromised engine 20, and the thrust output of the remaining online engines 20 can be increased to offset the shut off engine 20.

However, on smaller aircraft 10 and single engine aircraft 10 the remaining engine(s) may be insufficient to generate a required thrust for a desired engine operational mode. The illustrated two engine 20 aircraft 10 of FIG. 1 is one such example. In order to guard against the potential cyber-security intrusion described above, each of the engine controllers 22 and/or the general aircraft controller 40 includes a drag control channel in addition to the redundant FADEC control channels.

Figure 2:
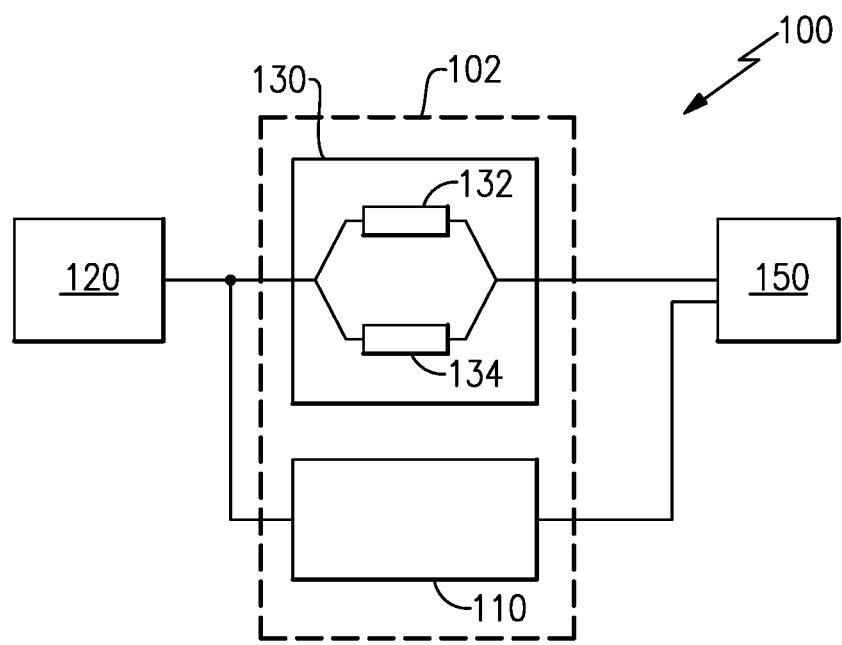
FIG. 2 schematically illustrates an exemplary engine controller including a drag control channel.

With continued reference to the aircraft 10 of FIG. 1, FIG. 2 schematically illustrates an exemplary engine controller 100 including an auxiliary drag control channel 110 according to one example. The engine controller 100 includes a set of engine sensor inputs 120 connected to various engine sensors. The engine sensor inputs 120 provide the sensed engine information to a thrust control channel 130 and to the drag control channel 110 of a FADEC 102. The thrust control channel 130 includes a primary channel 132 and a backup channel 134.

Each of the thrust control channel 130 and the drag control channel 110 are configured to output control signals to a set of engine effectors 150. The engine effectors 150 translate the thrust control outputs to various engine components to achieve a desired thrust according to known engine control techniques.

Under ordinary operating conditions, the thrust control channel 130 responds to pilot commands and adjusts engine thrust to maintain any given engine operational mode and velocity. By way of example, some engine operational modes can be approach power, cruise power, partial augmentor power, full augmentor power and idle power.

If a cyber-security intrusion of the engine controller 100 occurs it is possible for an outside actor to influence the control of the engine by providing false sensor data at the inputs 120 or providing false operational data to the primary channel 132 and the backup channel 134 of the thrust control channel 130. When such an influence is detected, either by automated aircraft systems, or by a pilot or ground crew monitoring aircraft operations, the pilot can switch the controls from the thrust control channel 130 to the drag control channel 110.

The drag control channel 110 is housed independently of the thrust control channel 130, and includes multiple hard coded engine operation points. Each of the hard coded engine operational points corresponds to a single engine operational mode. Due to the hardware nature of the drag control channel 110, digital intervention in the operational outputs to the engine effectors 150 from the cyber-security intrusion is not possible while the aircraft 10 is operating. By way of example, the drag control channel 150 can be a field programmable gate array (FPGA) with physical set states of each transistor within the FPGA. Further examples can use any similar hardware architecture to lock in the effector outputs from the drag control channel 110.

Figure 3:
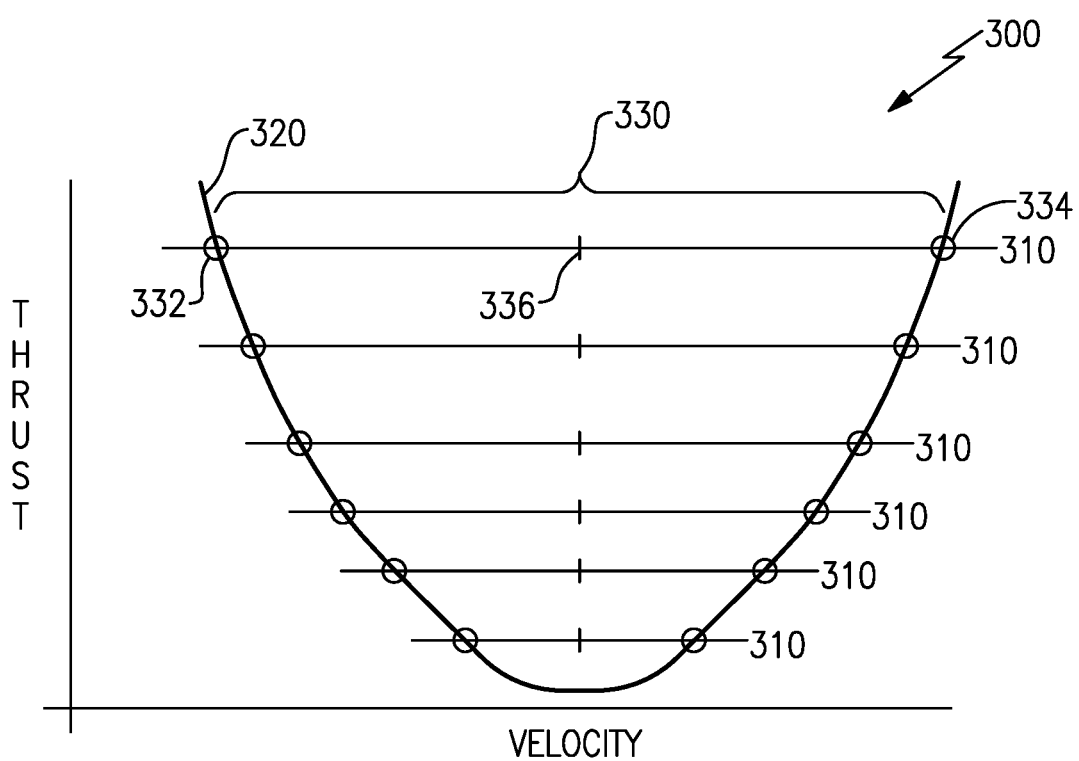
FIG. 3 illustrates an engine operational mode chart for a drag control channel.
Figure 4:
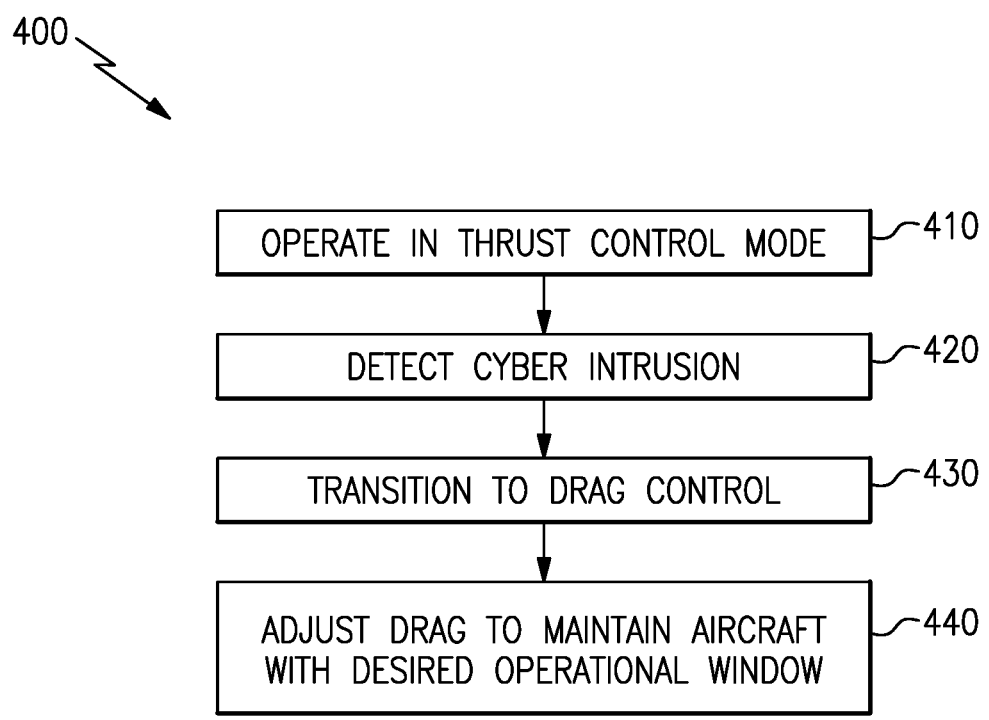
FIG. 4 illustrates a method of operating an aircraft.

Encoded within the drag control channel 110 are distinct nominal settings for each of the engine operation modes. The nominal settings are a pre-defined set of engine effector parameters to generate engine thrust at the desired engine operational mode under nominal conditions. As is understood, however, various external elements, and internal elements can impact the actual thrust produced as well as the effect of the produced thrust. With continued reference to FIG. 2, FIG. 3 illustrates an engine operational mode chart for the drag control channel.

The engine operational mode chart 300 is illustrated with engine thrust as the vertical axis, and velocity of the aircraft as the horizontal axis. As stated previously, the drag control channel 110 includes six pre-programed nominal thrust outputs 310. At each thrust output 310, an engine operational curve 320 defines a window of operations within the desired engine operational mode, with the leftmost point 332 of each window 330 being the lowest velocity within the given window 330 and the rightmost point 334 of each window 330 being the highest velocity within the given window 330. A center point 336 of each window 330 is the ideal velocity for operations within the operational mode 310. In alternative systems, the ideal point of operation may not be at the exact center of the window 330, and the operation curve 320 may not be a parabola as in the example of FIG. 3.

In a practical flight, conditions are not nominal. As a result, the actual velocity with nominal drag controls will be either to the left or right of the center point 336. In order to control the engine utilizing the drag controls, the pilot is able to engage, disengage, or alter various drag producing and reducing components across the aircraft 10, thereby adjusting the velocity and ensuring that the velocity remains within the window 330 and as close to the center point 336 as possible. By way of example, the various drag producing components can include speed brakes, landing gear, sideslip (yaw), flaps, spoilers, g-load and the like. In some examples, the pilot can engage any given drag producing or reducing component individually to impact the drag in a desired manner. In alternative embodiments, it is possible for a general drag control to be implemented, allowing the pilot to command an increased or decreased drag causing a controller to apply controls across the various drag producing or reducing components in order to implement the command.

With continued reference to the system illustrated in FIGS. 1-3, FIG. 4 illustrates a process 400 for operating an aircraft when a cyber-intrusion into a FADEC is detected. Initially the aircraft is operating in a thrust control mode in an "Operate in Thrust Control Mode" step 410. The thrust control mode is any conventional thrust control of the aircraft engine(s). When a cyber-intrusion is detected in a "Detect Cyber Intrusion" step 420, the pilot is notified, allowing the pilot to transition the engine controls from the thrust control channel of the engine controller to the drag control channel in a "Transition to Drag Control" step 430. In alternative examples, the pilot can detect the cyber intrusion when the aircraft begins providing incorrect thrust responses to any given input command from the pilot, and can enter the transition step 430.

Once the engine controller has switched to the drag control channel, the pilot sets a desired operational mode of the aircraft, causing the drag control channel to output hardwired engine settings for a nominal thrust of the desired operational mode. Once this has occurred, the pilot maintains the aircraft within the velocity window of the operational mode, by adjusting the drag of any number of drag producing or reducing components across the airframe in an "Adjust Drag to Maintain Aircraft Within Desired Operational Window" step 440.

While controlling the engine via the drag control channel, the pilot can further alter the operational mode, and transition to the new operational mode. By way of example, if the airplane is currently in cruise mode, and approaching the landing site, the pilot can switch the drag control channel to approach mode. When such a transition occurs, the engine thrust settings output by the drag control channel switch to the nominal thrust settings for the new operational mode, and drag control resumes as described above.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A powered aircraft comprising:
    at least one thrust producing engine;
    an engine controller controllably coupled to the at least one thrust producing engine, the engine controller including at least a first control channel and a drag control channel, wherein the first control channel is configured to control the at least one thrust producing engine via thrust control, and the drag control channel is configured to control the at least one thrust producing engine via drag control; and
    wherein drag control comprises outputting a fixed thrust for a desired engine operational mode and maintaining a velocity of the aircraft within a velocity window by adjusting at least one drag producing component of the aircraft.

2. The powered aircraft of claim 1, wherein the engine controller further comprises a redundant thrust control channel identical to the first control channel.

3. The powered aircraft of claim 1, wherein the drag control channel is a hardware control channel, and includes a plurality of encoded nominal thrust outputs, each of the nominal thrust outputs corresponding to one engine operational mode of a plurality of distinct engine operational modes.

4. The powered aircraft of claim 3, wherein the plurality of encoded nominal thrust outputs includes at least an approach power mode, a cruise power mode, and an idle power mode.

5. The powered aircraft of claim 4, wherein the plurality of encoded nominal thrust outputs includes a partial augmentor power mode, and a full augmentor power mode.

6. The powered aircraft of claim 3, wherein the drag control channel is a field programmable gate array (FPGA).

7. The powered aircraft of claim 3, wherein the each engine operational mode in the plurality of distinct engine operational modes is a pre-defined thrust and a window of aircraft velocities.

8. The powered aircraft of claim 1, wherein the at least one thrust producing engine is a plurality of thrust producing engines.

9. The powered aircraft of claim 8, wherein the engine controller is a general aircraft controller configured to control each of the thrust producing engines.

10. The powered aircraft of claim 8, wherein the engine controller is a dedicated engine controller for one of the thrust producing engines, and each other of the thrust producing engines includes a substantially identical engine controller.

11. A method for operating a powered aircraft comprising:
operating in a drag control mode by outputting a fixed thrust for a desired engine operational mode and maintaining a velocity of a powered aircraft within a velocity window corresponding to the fixed thrust by adjusting at least one drag producing component of the aircraft and thereby adjusting a drag of the aircraft; and
wherein maintaining the velocity of the powered aircraft within the velocity window comprises maintaining the velocity at an ideal operation point within the velocity window.

12. The method of claim 11, further comprising transitioning from a thrust control mode to the drag control mode in response to detecting a cyber-security intrusion.

13. The method of claim 11, wherein adjusting at least one drag producing component comprises individually adjusting at least one of a speed brake, a landing gear, a sideslip, a flap, and a spoiler.

14. The method of claim 13, wherein adjusting at least one drag producing component comprises individually adjusting each of the speed brake, the landing gear, the sideslip, the flap, and the spoiler.

15. The method of claim 11, wherein adjusting the at least one drag producing component comprises submitting one of an increase drag and a decrease drag command to a drag controller.

16. The method of claim 15, further comprising simultaneously and automatically adjusting multiple drag producing components using the drag controller in response to one of the increase drag command and the decrease drag command.

17. The method of claim 11, wherein the ideal operation point is a center point of the velocity window.

18. A method for operating a powered aircraft comprising:
detecting a cyber-security intrusion at an engine controller; and
transitioning from a thrust control channel to a drag control channel within said engine controller in response to detecting the cyber-security intrusion, wherein the drag control channel outputs a fixed thrust for a desired engine operational mode and a velocity of the aircraft is maintained within a velocity window by adjusting at least one drag producing component of the aircraft and thereby adjusting a drag of the aircraft.

* * * * *